United States Patent Office 2,955,107 Patented Oct. 4, 1960

1

2,955,107

PROCESS OF DEASHING POLYMERS WITH ALPHA DIKETONES

John R. Lovett, Metuchen, and Jeffrey H. Bartlett, New Providence, N.J., assignors to Esso Research and Engineering Company, a corporation of Delaware No Drawing. Filed June 4, 1958, Ser. No. 739,675

12 Claims. (Cl. 260—93.7)

This invention relates to an improved method of removing ash from low pressure hydrocarbon polymers. More particularly it relates to a process of this nature utilizing a small amount of an alpha diketone as the deashing agent.

The low pressure polymerization and copolymerization of alpha olefins and diolefins with catalyst systems made up of a partially reduced, heavy transition metal halide and a reducing metal-containing compound to high density, often isotactic, high molecular weight, solid, relatively linear products has been assuming ever increasing importance and is now well known. One of the problems in these low pressure polymers is the ash content caused principally by the catalyst systems utilized. The potential ash content varies depending upon the catalyst efficiency obtained in the polymerization but generally ranges from about 0.5 to 3.0 wt. percent as determined by a fusion technique (dry ash). It has been observed that polymers with ash contents greater than about 0.05 wt. percent discolor badly during processing and tend to corrode the metals commonly used in processing equipment. For this reason reduction of the ash content to less than 0.05 wt. percent is essential in order to produce a commercially desirable product.

Of the ash components it is the titanium-containing materials which are apparently the principal factors in the undesirable discoloration. This is shown in Table I below.

TABLE I

*Correlation between color of molded polypropylene and Ti content in ash*

[Other ash components constant]

| Polymer color: | Ti, p.p.m. oxide ash |
|---|---|
| Colorless (or white) | 0–60 |
| Pale yellow | 60–100 |
| Yellow | 100–160 |
| Amber | 160–200 |
| Dark amber | 200 |

This invention provides an improved method of removing ash from the polymers discussed. The method comprises washing out the catalyst residues contained in the polymerization mixture with small amounts of an alpha diketone to reduce the content to the desired level.

It is especially surprising to find that alpha diketones work in the manner indicated. Monocarbonyl compounds, e.g. acetone, are just about ineffective. Beta dicarbonyl compounds have been found to be effective but require rather large amounts of deashing material because their activity is based on chelation. The alpha diketones of this invention, however, operate by solubilization and therefore require less deashing agent. Thus, the same quality polymer (from a color corrosion and degradation point of view) can be obtained using 0.5/1 diacetyl/catalyst as can be obtained using about 2.0/1 acetylacetone/catalyst. This, of course, means that about ¼ as many moles of diacetyl or ⅕ by weight/lb. of polymer are required for adequate deashing.

2

The alpha diketones utilized are adjacent diones and can be characterized by the formula

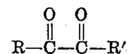

wherein R and R′ are selected from the groups consisting of aliphatic and aromatic radicals which can be the same or different. Particularly effective and desirable materials for this purpose are diacetyl (2,3 butanedione) and benzil (diphenyl diketone).

The amount of alpha diketone utilized is small, i.e. in the range of 0.5 to 4.0 moles per mole of catalyst residue and preferably 0.5 to 1.0 mole. The temperature of treatment is conveniently in the range of about 20° C. to 80° C., with a time interval in the range of about 30 minutes to 48 hours. The washing operation of this invention is preferably carried out employing a high degree of agitation such as is obtained with conventional commercial stirring apparatus. Very effective washings of polymeric products in accordance with the present invention are obtained when the washings are carried out in an inert atmosphere such as nitrogen. In general, the washing operation is carried out in a non-aqueous medium.

While the deashing is important for the removal of particularly the titanium-containing materials, it also removes other ash components and the term connotes the removal of other undesirable contaminants as shown.

For the purpose of convenience details of the low pressure catalytic process and the products obtained thereby are presented below, although it should be realized that these constitute no part of this invention.

The alpha olefinic feeds utilized in polymerization and copolymerization include ethylene, propylene, butene-1, heptene-1, dodecene-1, etc. with ethylene and propylene preferred.

Among the diolefins that can be used in copolymerization include butadiene, isoprene, piperylene, vinylcyclohexene, cyclopentadiene, 1,4-pentadiene, etc. It is to be understood that wherever the term "polymer" is used herein, it connotes both homo- and copolymers.

The process is described in the literature, e.g. see Belgian Patent 538,782 and "Scientific American," September 1957, pages 98 et seq.

In that process the polymers are prepared by polymerizing the constituent monomers in the desired proportions with the aid of certain polymerization catalysts, e.g., see above-mentioned Belgian patent. The catalysts are solid, insoluble, reaction products obtained by partially reducing a reducible, heavy, transition halide of a group IV*b* to VI*b* or VIII metal, etc. with a reducing group I and III metal-containing material such as an organometallic compound of an alkali, alkaline earth, rare earth metal or zinc. They can also be advantageously prepared by reducing an appropriate metal compound with the aid of metallic aluminum or a mixture of aluminum and titanium, etc. A catalyst of this type can thus be prepared by reducing 1 mole of titanium tetrahalide, usually tetrachloride, to the corresponding trivalent or sub-trivalent titanium halide with about 0.2 to 6 moles of aluminum triethyl, triisobutyl or other aluminum alkyl compound of the formula RR′AlX. In this formula R, R′ and X may alternatively be hydrogen or a halogen, notably chlorine. The reduction is carried out by dissolving each of the two catalyst components in an inert solvent, preferably a $C_3$ to $C_{18}$ paraffin such as isopentane or n-heptane, and mixing the two solutions in the proper proportions at temperatures between 0° and 150° C. and in the absence of moisture, oxygen and sulfur impurities. The resulting precipitate in conjunction with some free aluminum alkyl compound is generally considered to constitute the actual active polymerization catalyst. Alternatively, it is possible to carry out the catalyst preparation using only about 0.3 to 0.8 mole of the aluminum alkyl compound per mole of titanium chloride, and then add a supplemental amount of the aluminum alkyl compound to the polymerization zone to raise the Al/Ti mole ratio therein to a value between about 1:1 and 3:1.

The monomers are then contacted with the resulting catalyst in the presence of the same or differing inert hydrocarbon solvents such as isopentane, n-heptane, xylene, etc. The polymerization is conveniently effected at temperatures of about 0° to 100° C. and pressures ranging from about 0 to 500 p.s.i.g. usually 0 to 100 p.s.i.g. The catalyst concentration in the polymerization zone is preferably in the range of about 0.1 to 0.5 wt. percent based on total liquid and the polymer product concentration in the polymerization zone is preferably kept between about 2 to 15% based on total contents so as to allow easy handling of the polymerized mixture. The proper polymer concentration can be obtained by having enough of the inert diluent present or by stopping the polymerization short of 100% conversion. When the desired degree of polymerization has been reached, a lower, i.e., $C_1$ to $C_8$ alkanol such as methyl alcohol or isopropyl alcohol is normally added to the reaction mixture for the purpose of partially dissolving and deactivating the catalyst and for precipitating the polymer product from solution. The alcohol alone does not remove sufficient ash to afford a desirable product. After filtration, the solid polymer may be further washed with alcohol or acid such as hydrochloric acid, dried, compacted and packaged.

The polymers produced have molecular weights in the range of about 100,000 to 300,000 or even as high as 3,000,000 as determined by the intrinsic viscosity method using the I. Harris Correlation (J. Polymer Science, 8, 361, 1952). The polymers can have a high degree of crystallinity and a low solubility in n-heptane.

It is to be understood that the term "low pressure" polymer as used herein connotes material prepared in the indicated manner.

The treatment with the alpha diketone can take place prior to the filtration or other separation of the polymers or subsequent thereto. In both cases the alpha diketone can be utilized alone or in combination with other washing agents such as the alkanols, preferably dry.

This invention and its advantages will be better understood by reference to the following examples.

EXAMPLE 1

The polymer used for the deashing experiments described was made and processed as described in Table II.

TABLE II

*Polymerization conditions*

| | |
|---|---|
| Apparatus | Glass continuous unit. |
| Catalyst | $TiCl_3$—$AlEt_3$. |
| Al/Ti Ratio | 2:1. |
| Catalyst Concn., g./l. | 3.0. |
| Polymerization Temp. | 75° C. |
| Diluent | Xylene. |
| Run Length | 5 hours. |
| Residence Time | 1 hour. |

*Standard work-up procedure*

*Removal of polymer from reactor.*—Cuts were taken every 15 minutes under a $N_2$ atmosphere into an Erlenmeyer flask and 1/25 the precipitating volume of isopropanol. Volume of the cuts—approximately 250 ml. The flasks were stoppered and stored in a dry box.

*Precipitation of polymer.*—After standing the specified time (contact time) an equal volume of isopropanol was added. The mixture was stirred approximately 2 minutes and filtered. Evaporation of the filtrate yielded waxy polymer and the majority of the catalyst complexes.

*Washing of the filter cake.*—The filter cake was reslurried in 2X the amount of precipitant. The slurry was heated (60–80° C.) for 10 minutes with stirring and then filtered.

*Addition of oxidation inhibitors.*—The filter cake was slurried in acetone. The slurry was mixed and filtered. Drying of the polymer overnight in a vacuum oven at 60° C. preceded molding.

*Molding conditions.*—The polymer was molded at 400° F. for about 5 minutes.

The polymer cuts containing the respective quench liquids were allowed to stand for varying lengths of contact time before being worked up. Table III gives the results of this study along with an overall comparison of the deashing characteristics of acetylacetone and diacetyl. The theoretical ignition ash content was 1.3 wt. percent.

TABLE III

*Effect of contact time and molar ratio of deashing agent to catalyst on removal of ash constituents*

A. ACETYLACETONE

| Time of Contact | 24 Hours | | | | | | 48 Hours | | | | | |
|---|---|---|---|---|---|---|---|---|---|---|---|---|
| | Oxides, p.p.m. | | | | Total Oxide Ash, Wt. Percent | Dry Ash, Wt. Percent | Oxides, p.p.m. | | | | Total Oxide Ash, Wt. Percent | Dry Ash, Wt. Percent |
| Molar Ratio | Fe | Al | Ai | Ti | | | Fe | Al | Si | Ti | | |
| 0.5/1 | 12 | 114 | 55 | 314 | 0.05 | 0.07 | 11 | 69 | 38 | 218 | 0.034 | 0.036 |
| 1.0/1 | 3 | 52 | 73 | 178 | 0.031 | 0.039 | 7 | 54 | 69 | 93 | 0.022 | 0.020 |
| | 7 | 105 | 35 | 284 | 0.043 | 0.052 | 9 | 60 | 46 | 218 | 0.033 | 0.036 |
| 1.5/1 | 7 | 141 | 43 | 262 | 0.045 | 0.055 | 7 | 83 | 19 | 187 | 0.030 | -------- |
| 2.0/1 | 0 | 12 | 53 | 19 | 0.008 | 0.008 | 4 | 18 | 48 | 20 | 0.009 | 0.005 |
| | 0 | 4 | 32 | 38 | 0.007 | 0.008 | 1 | 12 | 26 | 21 | 0.006 | 0.001 |
| 3.0/1 | 0 | 6 | 38 | 29 | 0.006 | 0.004 | 0 | 14 | 22 | 14 | 0.005 | 0.003 |
| 4.0/1 | 0 | 6 | 41 | 8 | 0.005 | 0.005 | 0 | 12 | 40 | 10 | 0.006 | 0.006 |

B. DIACETYL

| Molar Ratio | Fe | Al | Ai | Ti | Total Oxide Ash, Wt. Percent | Dry Ash, Wt. Percent | Fe | Al | Si | Ti | Total Oxide Ash, Wt. Percent | Dry Ash, Wt. Percent |
|---|---|---|---|---|---|---|---|---|---|---|---|---|
| 0.5/1 | 0 | 212 | 58 | 148 | 0.042 | 0.026 | 3 | 102 | 48 | 62 | 0.022 | 0.011 |
| 1.0/1 | 0 | 138 | 81 | 87 | 0.030 | 0.027 | 4 | 79 | 77 | 31 | 0.019 | 0.017 |
| | 0 | 196 | 57 | 127 | 0.038 | 0.029 | 2 | 122 | 52 | 43 | 0.022 | 0.016 |
| 1.5/1 | 0 | 164 | 42 | 204 | 0.041 | 0.048 | 2 | 124 | 42 | 66 | 0.023 | 0.019 |
| 2.0/1 | 0 | 89 | 76 | 31 | 0.019 | 0.015 | 3 | 64 | 46 | 32 | 0.015 | 0.012 |
| | 0 | 151 | 57 | 128 | 0.034 | 0.027 | 3 | 86 | 45 | 50 | 0.018 | 0.014 |
| 3.0/1 | 0 | 145 | 37 | 159 | 0.034 | 0.027 | 2 | 94 | 36 | 49 | 0.018 | 0.013 |
| 4.0/1 | 0 | 83 | 66 | 43 | 0.019 | 0.012 | 2 | 64 | 40 | 24 | 0.013 | 0.141 |

These results demonstrate not only the efficacy of diacetyl for the claimed purpose but its distinct advantage over beta diketones (acetylacetone) when employed in smaller quantities. Thus, after 48 hours with molar ratios of deashing material in the range of 0.5 to 1.5:1, treatment with diacetyl reduced the titanium to the 50 p.p.m. range, contrasted with a similar reduction for acetylacetone to the 200 p.p.m. range.

EXAMPLE 2

Polymers prepared in the same manner as in Example 1 were treated with benzil. The results are shown in Table IV below.

TABLE IV

Benzil:

Contact Time ------------------- 24 hours.

| Molar ratio benzil catalyst: | Ash, wt. percent [1] |
|---|---|
| 2/1 | 0.025 |
| 4/1 | 0.028 (0.015) |

[1] Theoretical oxide ash. 1.2 wt. percent.

The marked reduction in ash is apparent.

Substituted derivatives of the alpha diketones of this invention can be employed. Alpha dialdehydes can also be employed, e.g., glyoxal. In addition, related compounds such as pyruvic acid have some utility although not as effective as the other specific compounds tested.

The advantages of this invention will be apparent to the skilled in the art. Polymer products of reduced ash content are provided with maximum efficiency and at little cost. The reduced amounts of reagent required effects desirable economies. A particular advantage of diacetyl is its favorable molecular weight as compared to acetylacetone.

It is to be understood that this invention is not limited to the specific examples which have been offered merely as illustrations and that modifications may be made without departing from the spirit of the invention.

What is claimed is:

1. A method of removing ash from a hydrocarbon polymer prepared in the presence of a catalyst containing a partially reduced, heavy, transition metal halide selected from Group IV–B and an alkyl aluminum compound, comprising contacting the polymerization mixture containing polymer and catalyst residues with a small amount of an alpha diketone corresponding to the formula—

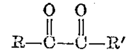

wherein R and R′ are hydrocarbon radicals.

2. The process of claim 1 in which the alpha diketone is used in a maximum amount of about 4.0 moles per mole of catalyst residue.

3. The method of claim 1 in which the contacting is carried out utilizing a $C_1$–$C_8$ alkanol in conjunction with the alpha diketone.

4. The method of claim 1 in which the alpha diketone is utilized in an amount of from 0.5 to 4.0 moles per mole of catalyst residue.

5. The method of claim 4 in which the temperature treatment is in the range of 20 to 80° C.

6. The method of claim 5 in which the time of treatment is in the range of about 15 minutes to 48 hours.

7. The method of claim 6 in which the alpha diketone is diacetyl.

8. The method of claim 6 in which the alpha diketone is benzil.

9. The method of claim 6 in which the polymer is a polypropylene polymer.

10. The method of claim 9 in which the alpha diketone is diacetyl.

11. A method of removing ash from a hydrocarbon polymer prepared in the presence of a catalyst containing a partially reduced, titanium halide and an aluminum alkyl compound which comprises contacting the polymerization mixture containing polymer and catalyst residues with a small amount of an alpha diketone corresponding to the formula

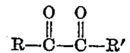

wherein R and R′ are hydrocarbon radicals.

12. The method of claim 11 in which the titanium halide is titanium trichloride and the aluminum alkyl compound is aluminum triethyl.

References Cited in the file of this patent

UNITED STATES PATENTS

| 2,850,488 | Baxter et al. | Sept. 2, 1958 |
|---|---|---|
| 2,890,214 | Brightbill et al. | June 9, 1959 |